Jan. 24, 1967  G. ZIEHM  3,300,783
DIRECTION FINDING
Filed Feb. 28, 1964  5 Sheets-Sheet 1

INVENTOR
GÜNTHER ZIEHM
BY Ezekiel Wolf, Wolf & Greenfield
ATTORNEYS.

INVENTOR
GÜNTHER ZIEHM

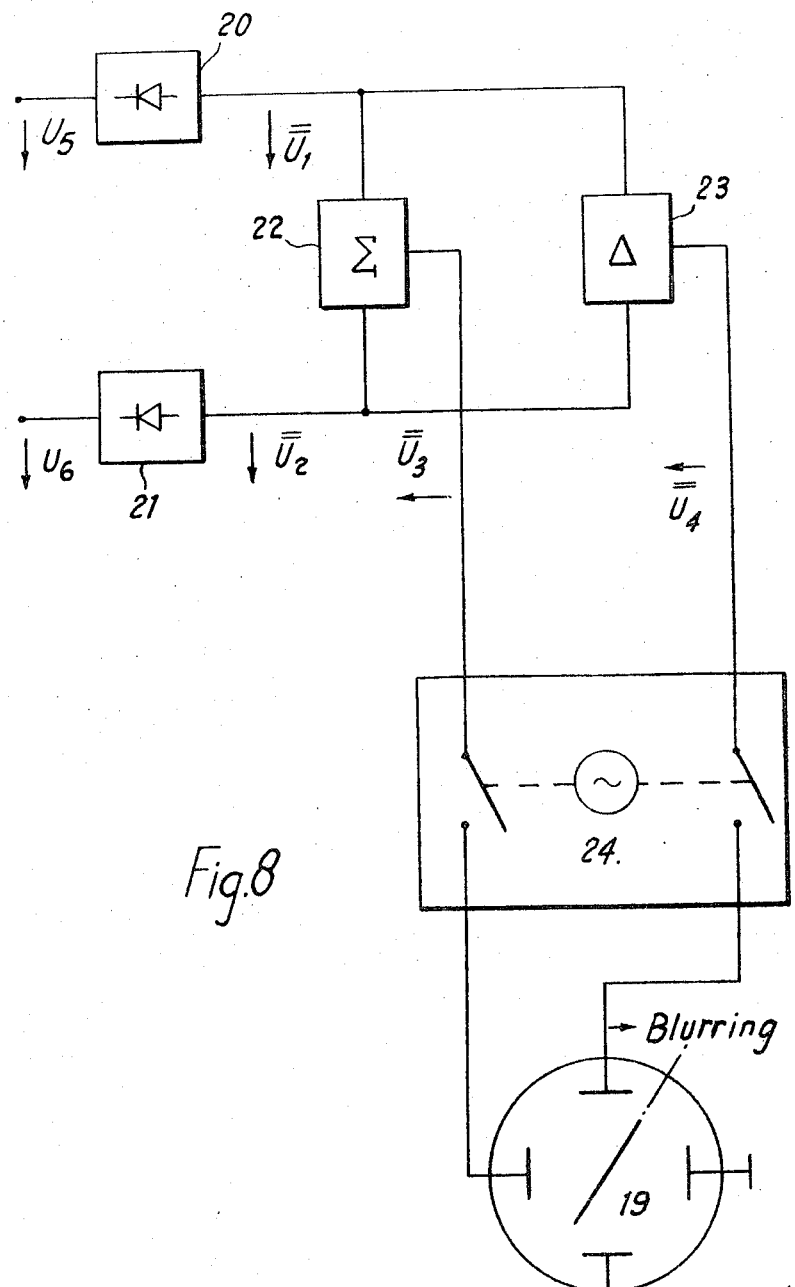

United States Patent Office 3,300,783
Patented Jan. 24, 1967

3,300,783
DIRECTION FINDING
Günther Ziehm, Bremen, Germany, assignor to
Atlas-Werke Aktiengesellschaft
Filed Feb. 28, 1964, Ser. No. 348,009
1 Claim. (Cl. 343—119)

If a plurality of electromagnetic waves produced by the same transmitter and therefore coherent arrive for example at the aerial system of a direction finding installation on different propagation paths, it is well known that in all direction finding methods, which for the purpose of determining the angle of incidence of the wave produce a conformal, quasistationary representation of the wave field in the interior of a goniometer, coordinate convertor, Braun tube, etc., two undesirable phenomena are to be observed:

(a) False bearing indiction (hereinafter abbreviated as "bearing error").

(b) So-called elliptical splitting of the bearing indication (hereinafter abbreviated as "blurring").

Various propagation paths may exist if the direction finding system is installed near any reflectors (for example a direction finding installation on a ship) or if in addition to the pure ground wave propagation the sky wave reflected from the ionosphere must also be taken into account. (Example: A direction finding installation at a great distance from the transmitter, so that the sky wave and ground wave have comparable orders of magnitude.)

The so-called "multibeam reception" described here need not however be the only cause for the occurrence of bearing errors and blurring. Another phenomenon is also known, namely the so-called "system errors" in direction finding aerial systems the geometrical dimensions of which are not small in relation to the electric wavelength. This type of error has for example been examined in detail in:

K. Baur: "Zur Theorie des allgemeinen Adcocks" ("Regarding the Theory of the General Adcock System"), AEÜ, volume 14 (1960), page 1 and page 57.

A. Troost: "Neuentwicklung von Kurzwellen-Adcock-Peilern" ("New Development of Adcock Short-Wave Direction Finders"), Telefunken-Ztg., year 25, March 1952, No. 94, page 16.

G. Ziehm: "Herleitung einer praktisch brauchbaren Näherungsformel für den natürlichen Peilfehler einer 6-Mast-Adcock-Anlage" ("Derivation of an Approximation Formula Utilisable in Practice for the Natural Bearing Error in a 6-Mast Adcock Installation"), Telefunken-Ztg., year 27, July 1954, No. 104, page 97.

As the most important result, it will merely be repeated that in Adcock direction finding systems having an even number of antenna elements system bearing errors may occur but system blurring cannot occur, and conversely that with an odd number of antenna system bearing errors are impossible but system blurring is possible.

Bearing errors and blurring can in every case greatly reduce the usefulness of a direction finding installation.

By a calibration operation known as correction for deviation, it is attempted to determine the quantity of the bearing error.

In order to eliminate blurring, so-called "deblurring" processes were known in the "goniometer" or "audible minimum direction finders" which were frequently widely used, but these methods have no connection with the new method described here for unblurred bearing indication, since they are based on a different physical principle, namely a "compensation process."

In the Watson-Watt "visual radio direction finder" which is almost exclusively used at the present time, no method of eliminating blurring has hitherto been known. The method according to the invention is however particularly advantageously applied precisely to the visual radio direction finder.

The advantages of reading an unblurred bearing indication as compared with reading a blurred bearing indication are well known and need not be further discussed here.

The utilisation of the method according to the invention is particularly favourable when the direction finding installation is near reflectors the action of which is considerable, as is always the case for example at certain frequencies on board ship. The "calibration" of the bearing errors is then impossible in many practical cases because of the heavily blurred bearing indication, since the bearing can be read only poorly or inaccurately.

Other features, objects and advantages of the invention will become apparent from the following specification when read in connection with the accompanying drawing in which:

FIG. 8 is a block diagram illustrating the logical arrangement of apparatus for providing an indication of the degree of blurring.

FIGURE 1 shows for example the bearing indication with heavy blurring on the Braun tube of a conventional "visual radio direction finder," and FIGURE 2 shows the bearing indication obtained by the method according to the invention. It is obvious that in the case of FIGURE 2 the calibration can be carried out more accurately and conveniently than in the case of FIGURE 1.

Because of the possibility of more convenient and more accurate calibration and reading, an increase in the accuracy of the direction finding installation is also achieved indirectly, although the bearing error itself remains unaffected by the application of the method according to the invention.

*Description of the elliptically polarised field*

As is well known, the elliptically polarised field can be described by two positionally orthogonal components which are of different magnitudes and which in respect of time have any desired phase difference. All previously known theoretical considerations of interference in direction finding systems are based on the abovedescribed representation of the field by orthogonal components.

H. Maurer and F. Fischer: "Die vom Schiff hervorgerugene Funkfehlweisung und ihre Kompensation" ("Radio Direction Finding Errors Produced by the Ship, and Their Compensation") Ann. d. Hydrogographie 54 (1926), p. 13.

G. Ziehm: "Grundlagen einer allgemeinen Theorie der Peilfehler auf Schiffen" ("Bases for a General Theory of Bearing Errors on Board Ships"), Frequenz, volume 16, No. 8, August 1962, page 281.

Another description of the "elliptically polarised" field is now also known from the general theory of alternating currents. Such a field can in fact be traced back to two inversely rotating fields of different magnitudes. Mathematically the transition from representation by orthogonal components to representation by rotating fields can be effected in the following manner:

Let $K_x$ and $K_y$ be the components in the $x$ and $y$ directions, and $D_L$ and $D_R$ the rotating fields in the left-hand and right-hand direction of rotation. $x$ and $y$ are two directions at right-angles to one another. Each of the quantities mentioned should have a determined magnitude and a determined phase position in relation to a 0 axis. The following relationships will then be true:

$$K_x + jK_y = 2D_L \quad (1)$$

$$K_x - jK_y = 2D_R \quad (2)$$

The factor $j=\sqrt{-1}$ symbolises a 90° phase rotation.

Since the term "rotating field" in the connection in which it is used here is not a general terminological usage, a short explanation will be inserted at this point.

Figure 3:
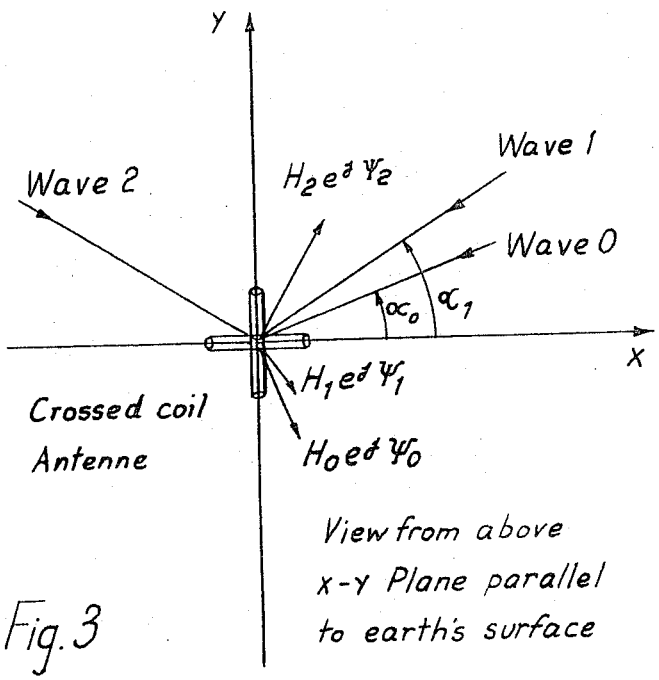
FIG. 3 is a diagrammatic representation of waves approaching a typical crossed coil direction finding antenna system helpful in understanding the cause of the blurring problem solved by the invention.

In a concrete case it is desired to calculate $D_L$ and $D_R$. "Multibeam incidence" of $n$ wave trains will be assumed, each of which is characterised by the magnetic field strength $H_n$, the phase $\psi_n$, and the direction $\alpha_n$, on a crossed-coil direction finding aerial system (FIGURE 3). After dividing each wave train into components of the Cartesian system $x-y$ and grouping together the components in accordance with Equations 1 and 2, we obtain relationships of the type:

$$2D_L = \sum_{n=0}^{\infty} H_n e^{j\psi_n} e^{-j\alpha n} \quad (3)$$

$$2D_R = \sum_{n=0}^{\infty} H_n e^{j\psi_n} e^{+j\alpha n} \quad (4)$$

Whereas in the case of a description of a wave field in Cartesian coordinates at the point $x=0$; $y=0$, only the amount of the $x$ and $y$ components of each wave train vary with $\alpha_n$, and the phases on the other hand remain constant, in the case of the description in rotating fields the rotating field portions of each wave train vary only in phase but not in amount. Proportionality exists between time phase and positional angle $\alpha_n$. Such behaviour is typical of rotating fields.

*Basis of the invention*

If bearing error and blurring are calculated direct from the two rotating fields, we obtain the following surprising and hitherto unknown results.

Blurring T depends only on the ratio of the amounts of the two rotating fields, in accordance with the equation:

$$T = \frac{1 - \left|\frac{D_L}{D_R}\right|}{1 + \left|\frac{D_L}{D_R}\right|} = \frac{|D_R| - |D_L|}{|D_R| + |D_L|} \quad (5)$$

By bearing error $\alpha$ we understand the difference between the angle $\epsilon$ read at the indicator of the direction finding installation and the desired reading angle $\epsilon_0$, which is the bearing defined by the line of direction joining the transmitter and the receiving direction finding aerial system. In the usual way, the scale of the indicator (goniometer, Braun tube) is so adjusted that $\alpha_0 = \epsilon_0$ and there are variations in the same direction of $\alpha_0$ and $\epsilon_0$.

In the example illustrated in FIGURE 3, the wave 0 should therefore come direct from the transmitter, while all other waves pass to the aerial system through various diversionary routes.

If only the wave 0 were present, the bearing error would be $\delta = 0°$.

In the general case, in the presence of all waves $0 \ldots n$, the bearing error is:

$$\delta = \alpha_0 - \epsilon \quad (6)$$

If the reading angle $\epsilon$ is calculated direct from the two defined rotating fields $D_L$ and $D_R$ for the only case which is of interest hereinafter, in which equal amounts of $D_L$ and $D_R$ are forcibly obtained by any means in the direction finding system, it is very surprisingly found that the same reading angle $\epsilon$ is obtained as when it is calculated direct from the Cartesian components of the wave field $K_x$ and $K_y$.

This gives rise to the realisation which is of the greatest importance to the present invention, namely:

(a) The physical cause of the bearing error arising from $\epsilon$ is exclusively the phase position of the two rotating fields.

(b) The physical cause of blurring is the differences in amount of the rotating field.

The reading angle $\epsilon$, from which the angle $\alpha_0$ is derived with a calibrated bearing error $\delta$, can be determined only from a phase measurement between $D_L$ and $D_R$, independently of the amounts of $D_L$ and $D_R$. Since the reading of $\epsilon$ is most convenient when no blurring exists, circuitry measures will conveniently be taken to ensure that $D_R$ and $D_L$ will always be equal.

According to the invention these realisations can be utilised to eliminate blurring by producing a supplementary phase difference of 90° between two of the electrical magnitudes which are derived from the wave field by means of aerials (HF technique) for receiving oscillators (acoustics), whereupon the total and difference of the magnitudes subjected to additional phase displacement of 90° are formed and the amplitude difference of the resulting total and difference is utilised to suppress or indicate the blurring. The suppression of the blurring may be effected by adopting suitable means for example utilising a limiter amplifier, to ensure that the amounts of the electrical magnitudes which correspond to the total and difference are made equal, while retaining the existing phase relations, then obtaining the total and difference from the electrical magnitudes which will then be equal in amount, and thereupon bringing the electrical magnitudes, which correspond to the total and difference, to the same phase position, and finally utilising an indicator method to obtain the bearing from the total and difference the phase of which has been made the same. The advantage is thereby gained that the indication is no longer affected by blurring.

If it is desired to indicate the blurring, this can be done by obtaining the amounts in any manner from the total and difference of the magnitudes which have been given an additional phase displacement of 90°, then obtaining again the total and difference from these amounts, thereupon in some known manner forming the quotient of the difference and total of the amounts and indicating as a measure of the blurring the electrical magnitude corresponding thereto.

The invention will now be explained in greater detail with reference to some examples of its performance.

*Method of bearing indication without blurring*

Figure 4:
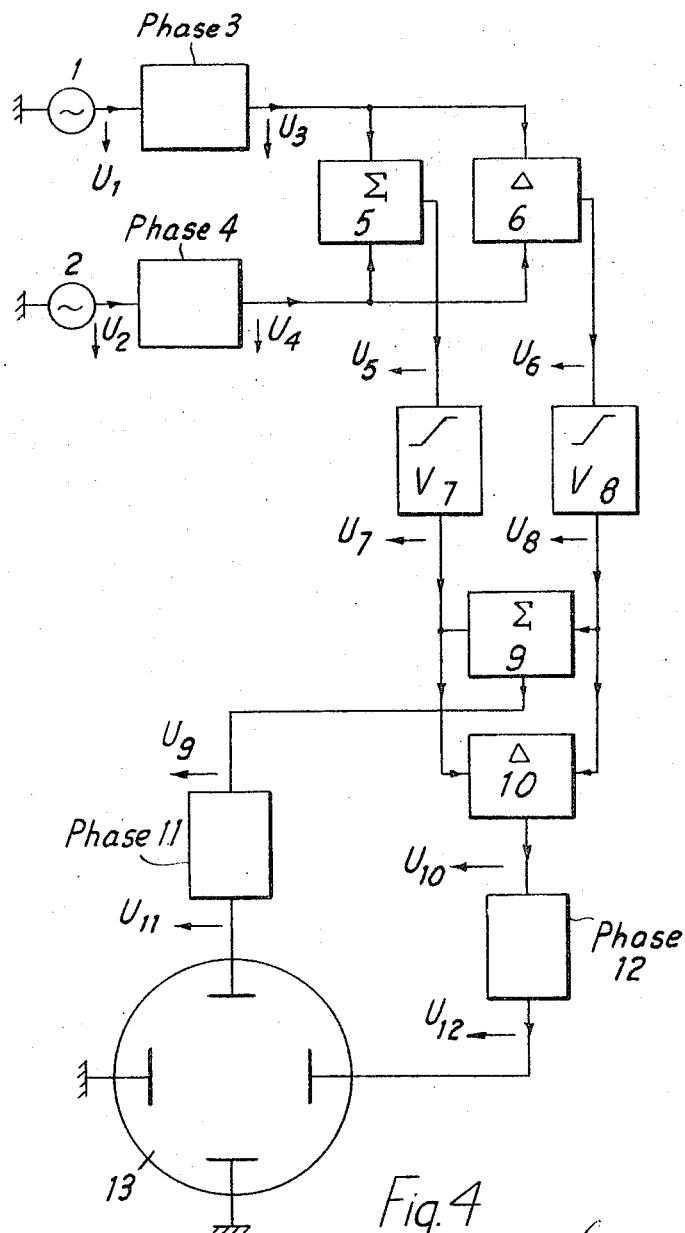
FIG. 4 is a block diagram illustrating the logical arrangement of a system according to the invention.

(a) *In visual radio direction finding systems.*—If circuitry measures are taken to ensure that the amounts of the two rotating fields are always equal, the desired blurr-free indication of the bearing is obtained. FIGURE 4 illustrates a corresponding block circuit arrangement in which the equality of the amounts is obtained by means of limiter amplifiers 7 and 8.

To be more precise, the circuit arrangement operates in the following manner:

The generators 1 and 2 symbolise the two voltages or currents, which for example in the crossed-coil direction finding system correspond to the orthogonal components of the magnetic field at the location of the crossed-coil direction finding aerial system. The frequency of the generators 1 and 2 need not necessarily coincide with the frequency of the field. For example, the generators may already represent the intermediate frequency outputs of a two-channel amplifier, if the superhet principle is employed. It is of no importance to the invention from what aerial system the generator voltages 1 and 2 actually originate. All types of aerials are technically utilisable in which from the wave field two electrical magnitudes are formed from which the direction of incidence of the wave is derived, as is for example the case with the crossed-coil direction finding system, crossed-dipole direction finding system, or the four-element Adcock system.

If on the other hand use is made of group aerials with any desired number and spatial arrangement of the individual elements, it is well known that corresponding voltages are formed from which the direction of incidence of the wave can be derived with the aid of active or passive networks, goniometers, or arrangements which are known as coordinate transformers.

K. Baur: "Beitrag zur Theorie des Goniometers und Koordinaten-Transformators" ("Contribution to the Theory of the Goniometer and Coordinate Transformer"), Frequenz, vol. 10, No. 7, July 1956, page 213.

G. Ziehm: "Winkeltreue kapazitive Goniometer" ("Conformal Capacitive Goniometers"), Frequenz, vol. 12, No. 9, 1958, page 293.

Behind the generators 1 and 2 devices 3 and 4 are connected which influence the relative of the voltages 1 and 2 in such a manner that the phase difference between the voltages $U_3$ and $U_4$ is greater or smaller by 90° than the phase difference between $U_1$ and $U_2$. The amplitude of $U_3$ is equal or proportionate to $U_1$. $U_4$ is equal or proportionate to $U_2$. The proportionality factor is the same in both cases.

The voltages, the relative phase of which has been shifted but the amplitudes of which are unchanged or changed by a common proportionality factor, are added in a block 5 and subtracted from one another in a block 6. By addition and subtraction vectorial operations are here to be understood. Let the total voltage be $U_5$ and the differential voltage $U_6$. These voltages already correspond to the rotating fields $D_L$ and $D_R$ in accordance with the Equations 1 and 2, apart from any common proportionality factors.

Figure 5:
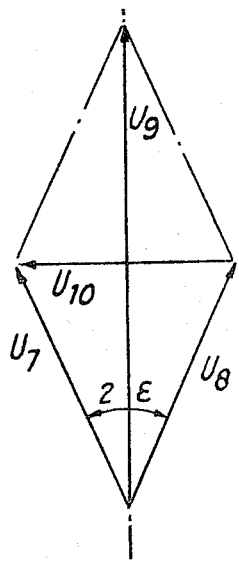
FIGS. 5 and 6 are vector diagrams helpful in understanding the principles described in the specification.

Whether $U_5$ is proportional to $D_L$ and $U_6$ is proportional to $D_R$, or vice-versa, depends on the direction of the phase shifts in the devices 3 and 4. The voltages $U_5$ and $U_6$ are passed, either directly or through any desired identical active or passive circuit elements, to the inputs of identical conventional limiter amplifiers in blocks 7 and 8. The output voltages $U_7$ and $U_8$, which are sinusoidal in respect of time, are equal in amount but between them there is the same phase difference as between the voltages $U_5$ and $U_6$. From the voltages $U_7$ and $U_8$, which are equal in amount, the vector total is formed in a block 9 and the vector difference in a block 10. As FIGURE 5 shows, the total voltage $U_9$ and differential $U_{10}$ are 90° out of phase in respect of time. Phase-shifting blocks 11 and 12, to the inputs of which $U_9$ and $U_{10}$ are connected, ensure that the output voltages $U_{11}$ and $U_{12}$ are cophasal. The amount of $U_{11}$ is proportional to the amount of $U_9$, and the amount of $U_{12}$ is similarly proportional to $U_{10}$. The voltages $U_{11}$ and $U_{12}$ finally pass, after any necessary equal amplifications, to the vertical or horizontal deflector plates of a Braun tube 13, and there indicate the bearing.

(b) *In goniometer direction finding systems.*—As has already been stated, the reading angle $\epsilon$, from which the desired angle $\alpha_0$ is derived, depends exclusively on the phase difference between the two rotating fields $D_L$ and $D_R$ (the amounts of which have been made equal). If we calculate $\epsilon$ in detail, we obtain:

$$\epsilon = \alpha_0 + \frac{(\vartheta_L - \vartheta_R)}{2} \quad (7)$$

$\vartheta_L$ here designates the phase difference for $D_L$, which exists between the two operating conditions: incidence of a single wave 0 from $\alpha_0$ and multibeam incidence with the same $\alpha_0$. $\vartheta_R$ has the same significance with regard to $D_R$.

Apart from the simple possibility of utilizing a goniometer having a zero indicator for indicating the bearing, instead of the Braun tube illustrated in FIGURE 4, a more favourable circuit arrangement exists in which the constructional element 9 ($\Sigma$) shown in FIGURE 4 is not required.

Figure 6:
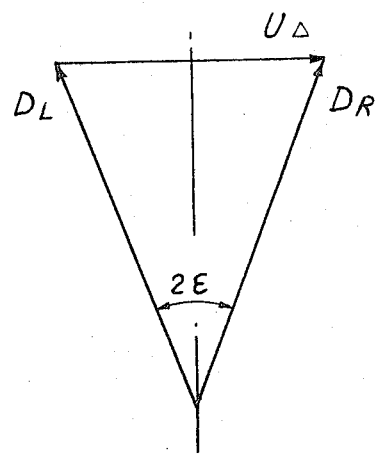

It can in fact easily be shown that the phase difference between $D_L$ and $D_R$ is equal to twice the reading value $\epsilon$ (FIGURE 6).

With the aid of a phase measurement alone it is therefore possible to derive $\alpha_0$ by any desired method if $\delta$ is known through the previously mentioned calibration operation.

FIGURE 6 shows the two rotary fields $D_L$ and $D_R$ for a determined angle $\alpha_0$. The differential voltage between $D_L$ and $D_R$ has the amount:

$$|U_\Delta| = 2|D_L| \sin \epsilon = 2|D_R| \sin \epsilon \quad (8)$$

$|U_\Delta|$ thus disappears for $\epsilon = 0$ or 180°.

The 0 positions of $|U_\Delta|$ can for example be used as a criterion for reading the bearing if the phase between $D_L$ and $D_R$ is varied in a measurable manner by any desired method until $|U_\Delta|$ disappears.

Figure 7:
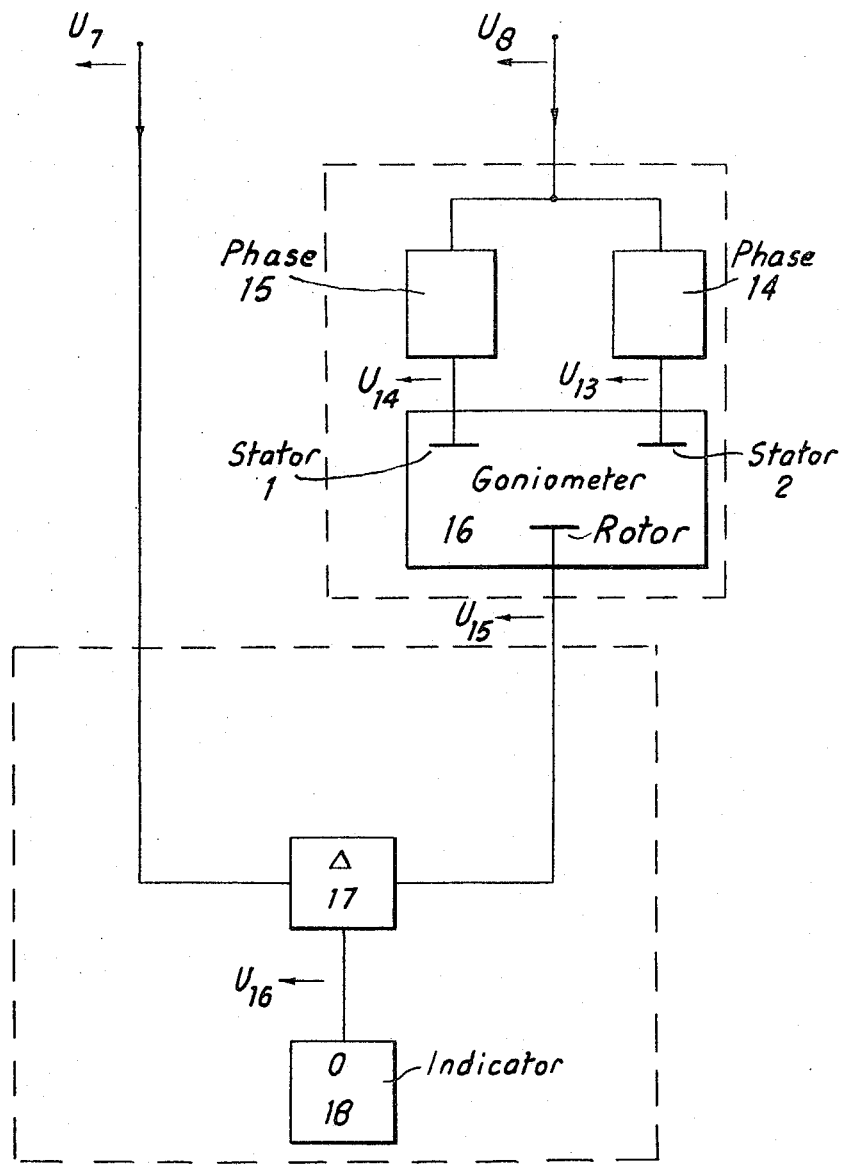
FIG. 7 is a block diagram illustrating the logical arrangement of a system according to the invention in which a goniometer is used as a phase displacer.

FIGURE 7 shows a corresponding circuit example in which a goniometer 16 is used as phase displacer. Equal voltages $U_7$ and $U_8$ in FIGURE 4 are taken as the basis.

The voltage $U_8$ is passed to blocks 14 and 15 which have the object of producing two equal voltages $U_{13}$ and $U_{14}$ which however have a phase displacement of 90°.

$U_{13}$ and $U_{14}$ pass to the two stators, which are offset spatially by 90° in a goniometer 16. A pure rotating field then exists in the interior of the goniometer, as is well known. The voltage $U_{15}$ produced at the rotor of the goniometer varies only its phase with the angle of adjustment, while its amount always remains the same. Let the goniometer 16 and the building bricks 14, 15 be so dimensioned that $U_{15} = U_7$.

In a block 17 the differential voltage $U_{16}$ between $U_7$ and $U_{15}$ is formed, this voltage being equal to zero (0 indicator block 18) when $U_7$ and $U_{15}$ are equal in phase. This equality of phase is now obtained by turning the goniometer. By means of a single calibration operation, the relationship between phase and the desired angle $\alpha_0$ can easily be determined. Thus from the adjustment of the phase displacer (here consisting of the blocks 14, 15 and 16), the desired angle $\alpha_0$ can thus be derived.

*Separate indication of blurring*

Figure 1:
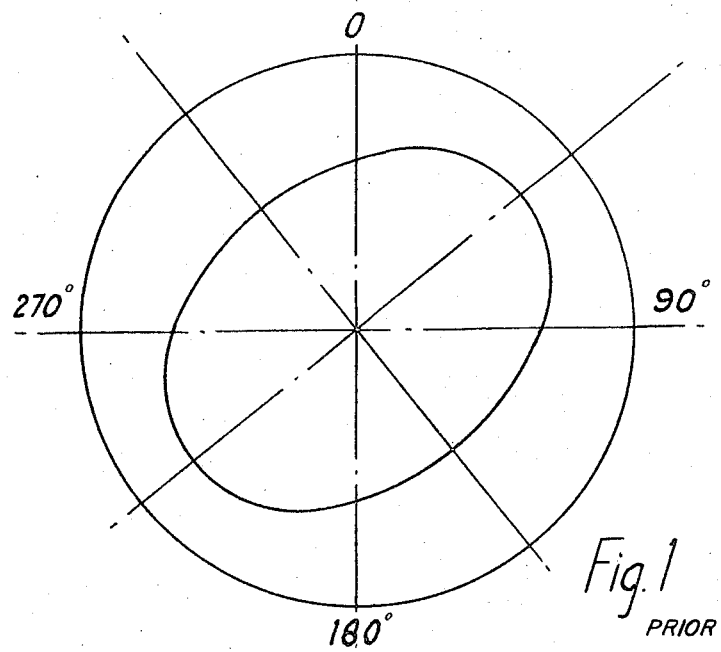
FIG. 1 illustrates a blurred bearing indication typically presented on the Braun tube of a conventional visual radio direction finder.

In special cases, knowledge of blurring may be of importance in a direction-finding system, for example as a "warning" in respect of the reliability of a direction-finding result, or in order to differentiate between two different directions of incidence $\alpha_0$ despite the some reading angle $\epsilon$. As a detailed theoretical consideration shows (G. Ziehm: "Grundlagen einer allgemeinen Theories der Peilfehler auf Schiffen," Frequenz, vol. 16, No. 8, August 1962, p. 281) (Bases of a General Theory of Bearing Errors on Ships), it is in fact conceivable that in special local circumstances in the case of multi-beam incidence that the case will occur where the bearing indication, that is to say the angle $\epsilon$, will remain constant in certain ranges of $\alpha_0$ despite the variation of $\alpha_0$. The blurring on the other hand varies relatively considerably in this range. In practice this phenomenon is known as "sticking bearing." In the calibration of the direction-finding system, the so-called "correction for deviation," it has hitherto never been possible or at least completely possible under practical conditions to determine quantitatively at the same time blurring and bearing error. The reasons for this are readily understood. The reading of blurring in the hitherto always customary bearing indication on the visual radio direction finder illustrated in FIGURE 1 requires the instantaneous determination of two measured magnitudes, namely the large and small diameters of the ellipse. The angular position of the longer axis of the ellipse has however to be determined at the same time. Since however a vehicle, for example a ship, is in continuous circular travel around the transmitter during the "correction for deviation," the necessary instantaneous determination of the three measurement values is impossible unless photographic or other storage methods are utilised in the case of the visual radio direction finder. In addition there is the previously mentioned disadvantage that in the case of heavy blurring the reading of the bearing is in any case not completely successful.

Figure 2:
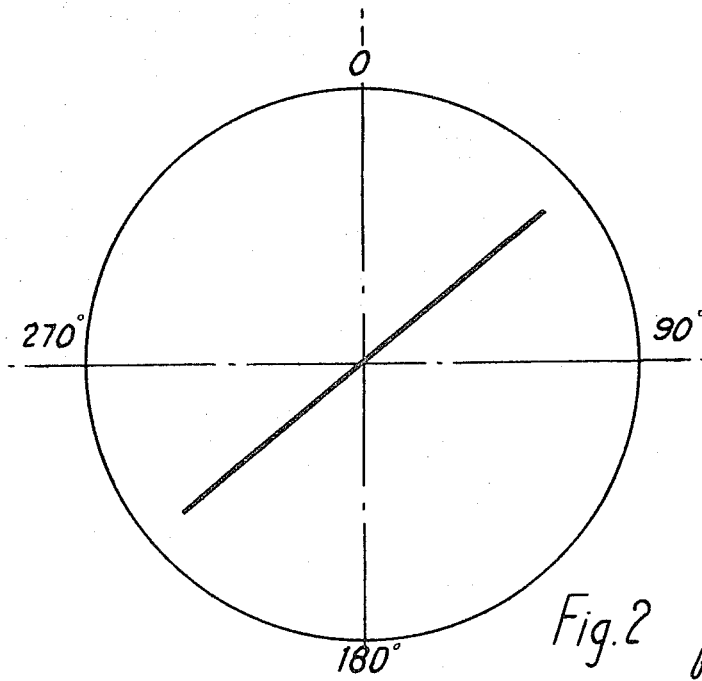
FIG. 2 shows the sharp bearing indication provided in accordance with the invention.

For these reasons it appears advantageous for the indication of the bearing to be effected "without blurring" with the aid of the above-mentioned methods, that is to say in accordance with FIGURE 2 in the case of the visual radio direction finder, but for the blurring to be additionally determinable by any other method. In the example illustrated in FIGURE 4, this is possible if the voltage $U_5$ and $U_6$ are fed to separate quantity indicating instruments. Since $U_5$ and $U_6$ correspond to the amounts of the rotating fields $D_L$ and $D_R$, the blurring can be calculated in accordance with Equation 6. Because of the necessary mathematical determination of the quotient, this method however is too complicated. However, dividing circuits are known both on an analogue and on a digital basis from the technique of electronic calculating machines, and these will enable the quotient of two electrical magnitudes to be determined direct.

In order to facilitate the task, use may also be made of the fact that $U_5$ and $U_6$ may be rectified in order to form the quotient, so that only the total, difference, and quotient of pure direct current magnitudes have to be formed. As an example, FIGURE 8 shows an analogue method of indicating blurring with the aid of a Braun tube 19. The voltages $U_5$ and $U_6$ in FIGURE 4 are the starting point. The two voltages, or magnitudes proportional to them in the same manner, are rectified (blocks 20 and 21). The direct current voltages $\overline{\overline{U}}_1$ and $\overline{\overline{U}}_2$ are obtained. The total and difference of these two voltages are then formed in the blocks 22 and 23. $\overline{\overline{U}}_3$ and $\overline{\overline{U}}_4$ are obtained. If $\overline{\overline{U}}_3$ and $\overline{\overline{U}}_4$ were passed direct to the pairs of plates of the Braun tube 19, an illuminated spot would be obtained from the angular position of which the ratio $\overline{\overline{U}}_3/\overline{\overline{U}}_4$, that is to say the blurring, can already be derived. The two direct current voltages $\overline{\overline{U}}_3$ and $\overline{\overline{U}}_4$ are however advantageously converted, before being passed to the deflector plates of the Braun tube 19, into two alternating current voltages of the same frequency and phase, with quantities proportional to $\overline{\overline{U}}_3$ and $\overline{\overline{U}}_4$, so that on the Braun tube a luminous line is formed, from the agnular position of which the blurring is obtained by known trigonometrical relationships. The angle scale of the oscillograph tube can of course be calibrated direct in units of blurring. The conversion of the direct current voltages $\overline{\overline{U}}_3$ and $\overline{\overline{U}}_4$ into alternating current voltages can for example be effected by means of vibrators (block 24).

Within the framework of the invention many modifications and different embodiments are also possible. Thus, the phase relation of the electrical magnitudes, the amounts of which have been made equal, can be utilised in any desired manner for indicating the bearing. Instead of the usual total-difference method of phase indication, one or both of the magnitudes the amounts of which have been made equal can be turned in phase in a manner capable of defined measurement, by means of any desired phase shifter, until the turned voltages assume a predetermined characteristic phase relationship to one another, which is verified by a measuring instrument. The measuring instrument can in this case be constructed to detect not only the predetermined phase relationship but also as a regulating instrument for automatically operating the phase shifter.

Instead of two, it is also possible to use more than two electrical magnitudes, which are proportional to the components of the wave field, for the purpose of the measurement, these components being grouped together, preferably linearly, in such a manner that two or more new electrical magnitudes are formed from them which are made equal in amplitude by any measures, while these new equal magnitudes are then preferably combined linearly again, and the new combined magnitudes are then influenced as regards phase position in a direction suitable for an indicator, and are used to indicate the bearing on said indicator.

The electrical magnitude serving as a measure of the blurring and corresponding to the difference and total of amounts can be utilised in another circuit arrangement for operating a regulation process, with the aid of which the electrical magnitudes corresponding to the orthogonal components of the wave field are varied individually or jointly in respect of amount or phase, or else simultaneously in respect of amount and phase, in respect of their original phase positions or amounts, in such a manner that the bearing indication indicates as accurately as possible the desired angle of incidence. This measure is based on the realisation that the blurring also constitutes a measure of the bearing angle.

In addition, instead of being indicated separately, the blurring may also be combined with the bearing indication, by utilising an electrical magnitude corresponding to the aforesaid quotient in another circuit arrangement for operating a regulating process, with the aid of which the electrical magnitudes fed to the indicator for indicating the bearing are varied in respect of amount or phase, or else simultaneously in respect of amount and phase, in relation to their original phase positions or amounts, in order that the output magnitude of the indicator may in any manner receive additional information regarding the blurring existing. This can for example be done by using as indicator for the bearing indication a Braun tube in which the angular position of the luminous line is a measure of the bearing indication and the deflection voltages are influenced in dependence on the magnitude corresponding to the quotient in such a manner that the length of the luminous line constitutes a measure of the blurring.

The deflection voltages may however also be controlled by the quotient in such a manner that the luminous line undergoes periodical angular deflections the magnitude of which constitutes a measure of the blurring.

Particularly for the digital indication which is described further below, it may also be of importance to obtain linearity of dependence for the magnitudes to be indicated. For this purpose the total or difference can be formed from the electrical magnitudes of equal amount, and then for example the resulting difference can be passed to an amplifier, the amplification factor of which is a function of said electrical magnitude.

The output magnitude of the amplifier is then the product $V(U_1).U_1$, where $V(U_1)$ should be the amplification dependent on the input magnitude $U_1$. $V(U_1)$ is so dimensioned that $U_2 = $const. $\epsilon$. The electrical output magnitude is then fed either direct or through any linear transmission quadrupole to a known digital voltmeter and is a direct measure of the angle $\epsilon$, which in turn has a linear relationship to the direction of incidence $\alpha_0$ to be determined.

To find a voltage proportional to the blurring, assumes a circuit arrangement the essential features of which have already been enumerated. In particular use should be made for this purpose of circuit arrangements in which pure direct current voltage magnitudes (time constant magnitudes) are utilised. The electrical magnitude proportional to the aforesaid quotient is measured by means of a digital voltmeter either direct or after conversion of the time constant magnitude into a quantity-proportional, time variable magnitude, preferably into a magnitude having a sinusoidal time path.

The blurring can also be eliminated by deriving the total and difference before equalisation, then forming the amounts in any way, and deriving the quotient therefrom as a measure of the blurring.

The elimination of blurring according to the present invention also affords the particular advantage that the voltage magnitudes derived for the bearing angle or the quotient magnitudes of the voltages serving for determining the blurring can be measured by means of simple digital voltmeters, so that for the digital indication it is no longer necessary to use the hitherto customary circuitous method of analogue indication.

I claim:
Direction finding apparatus comprising,
means defining a directional transducing system responsive to wave energy for providing a corresponding electrical signal and having dimensions which are small compared to a wavelength of the wave energy for providing first and second transduced input signals,
means for displacing the phase of said first and second signals to provide third and fourth signals displaced in phase by an electrical angle that differs by substantially 90 degrees from the relative phase between said first and second signals,
said first and second transduced signals corresponding to two spatially angularly offset field components of wave energy incident upon said transducing system,
means for cumulatively combining said third and fourth signals to provide a fifth signal that is the sum thereof,
means for differentially combining said third and fourth signals to provide a sixth signal that is the difference thereof,
means responsive to said fifth and sixth signals for providing seventh and eighth signals of substantially equal amplitude and relative phase substantially the same as that between said fifth and sixth signals,
means for providing an indication of the phase difference between said seventh and eighth signals,
and means for providing a quotient signal representative of the ratio of said sum and said difference which signal is representative of the degree of blurring present in a signal derived from said first and second transduced signals for indicating the direction of wave energy incident upon said transducing system.

References Cited by the Examiner
UNITED STATES PATENTS 2,468,093  4/1949  Marchand _____ 343—119
3,064,253  11/1962  Kirkpatrick.

CHESTER L. JUSTUS, *Primary Examiner.*

RODNEY D. BENNETT, *Examiner.*

R. E. BERGER, *Assistant Examiner.*